(12) United States Patent
Takabe et al.

(10) Patent No.: US 9,322,087 B2
(45) Date of Patent: Apr. 26, 2016

(54) STAINLESS STEEL FOR OIL WELL, STAINLESS STEEL PIPE FOR OIL WELL, AND METHOD OF MANUFACTURING STAINLESS STEEL FOR OIL WELL

(71) Applicant: NIPPON STEEL & SUMITOMO METAL CORPORATION, Tokyo (JP)

(72) Inventors: Hideki Takabe, Osaka (JP); Kunio Kondo, Sanda (JP); Hisashi Amaya, Kyoto (JP); Taro Ohe, Izumiotsu (JP); Yohei Otome, Amagasaki (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 0 days.

(21) Appl. No.: 14/793,916

(22) Filed: Jul. 8, 2015

(65) Prior Publication Data

US 2015/0307972 A1     Oct. 29, 2015

Related U.S. Application Data

(60) Division of application No. 13/276,374, filed on Oct. 19, 2011, now Pat. No. 9,109,268, which is a continuation of application No. PCT/JP2010/058304, filed on May 17, 2010.

(30) Foreign Application Priority Data

May 18, 2009    (JP) .................................. 2009-119990

(51) Int. Cl.
*C21D 8/00*    (2006.01)
*C22C 38/50*    (2006.01)
(Continued)

(52) U.S. Cl.
CPC ................ *C22C 38/50* (2013.01); *C21D 6/004* (2013.01); *C21D 6/005* (2013.01); *C21D 6/008* (2013.01); *C21D 8/005* (2013.01); *C21D 8/0205* (2013.01);
(Continued)

(58) Field of Classification Search
CPC ........... C21D 8/00; C21D 8/005; C22C 38/42
USPC .......................................... 148/325, 506, 609
See application file for complete search history.

(56) References Cited

U.S. PATENT DOCUMENTS

| | | | |
|---|---|---|---|
| 2006/0243354 A1 | 11/2006 | Kimura et al. |
| 2007/0074793 A1 | 4/2007 | Kimura et al. |
| 2011/0014083 A1 | 1/2011 | Amaya et al. |

FOREIGN PATENT DOCUMENTS

| | | |
|---|---|---|
| CA | 2 717 104 | 10/2009 |
| EP | 1 683 885 | 7/2006 |

(Continued)

*Primary Examiner* — Brian Walck
(74) *Attorney, Agent, or Firm* — Clark & Brody

(57) ABSTRACT

The chemical composition of a stainless steel in accordance with the present invention consists of C: not more than 0.05%, Si: not more than 0.5%, Mn: 0.01 to 0.5%, P: not more than 0.04%, S: not more than 0.01%, Cr: more than 16.0 and not more than 18.0%, Ni: more than 4.0 and not more than 5.6%, Mo: 1.6 to 4.0%, Cu: 1.5 to 3.0%, Al: 0.001 to 0.10%, and N: not more than 0.050%, the balance being Fe and impurities, and satisfies Formulas (1) and (2). Also, the micro-structure thereof contains a martensitic phase and a ferritic phase having a volume ratio of 10 to 40%, and the ferritic phase distribution ratio is higher than 85%.

$$\mathrm{Cr+Cu+Ni+Mo} \geq 25.5 \quad (1)$$

$$-8 \leq 30(\mathrm{C+N})+0.5\mathrm{Mn}+\mathrm{Ni}+\mathrm{Cu}/2+8.2-1.1(\mathrm{Cr+Mo}) \leq -4 \quad (2)$$

4 Claims, 4 Drawing Sheets

(51) Int. Cl.
| | |
|---|---|
| *C21D 8/02* | (2006.01) |
| *C21D 8/10* | (2006.01) |
| *C21D 9/08* | (2006.01) |
| *C22C 38/00* | (2006.01) |
| *C22C 38/02* | (2006.01) |
| *C22C 38/04* | (2006.01) |
| *C22C 38/06* | (2006.01) |
| *C22C 38/42* | (2006.01) |
| *C22C 38/44* | (2006.01) |
| *F16L 9/02* | (2006.01) |
| *C21D 6/00* | (2006.01) |
| *C22C 38/46* | (2006.01) |
| *C22C 38/48* | (2006.01) |

(52) U.S. Cl.
CPC   *C21D 8/105* (2013.01); *C21D 9/08* (2013.01); *C21D 9/085* (2013.01); *C22C 38/001* (2013.01); *C22C 38/002* (2013.01); *C22C 38/004* (2013.01); *C22C 38/02* (2013.01); *C22C 38/04* (2013.01); *C22C 38/06* (2013.01); *C22C 38/42* (2013.01); *C22C 38/44* (2013.01); *C22C 38/46* (2013.01); *C22C 38/48* (2013.01); *F16L 9/02* (2013.01); *C21D 2211/005* (2013.01); *C21D 2211/008* (2013.01)

(56) References Cited

FOREIGN PATENT DOCUMENTS

| | | |
|---|---|---|
| JP | 07-179943 | 7/1995 |
| JP | 2005-336595 | 12/2005 |
| JP | 2006-016637 | 1/2006 |
| JP | 2007-332431 | 12/2007 |
| JP | 2007-332442 | 12/2007 |
| JP | 2008-081793 | 4/2008 |

STAINLESS STEEL FOR OIL WELL, STAINLESS STEEL PIPE FOR OIL WELL, AND METHOD OF MANUFACTURING STAINLESS STEEL FOR OIL WELL

TECHNICAL FIELD

The present invention relates to a stainless steel for oil well and a stainless steel pipe for oil well. More particularly, the present invention relates to a stainless steel for oil well and a stainless steel pipe for oil well, which are used in a high-temperature oil well environment and gas well environment (hereinafter, referred to as "a high-temperature environment").

BACKGROUND ART

Recently, the development of oil wells and gas wells in deep layer has been advanced. (hereinafter, an oil well and a gas well are collectively referred simply to as "an oil well". Also herein, "a stainless steel for oil well" includes a stainless steel for oil well and a stainless steel for gas well, and "a stainless steel pipe for oil well" includes a stainless steel pipe for oil well and a stainless steel pipe for gas well.) A deep oil well has a high-temperature environment. "A high-temperature environment" contains carbon dioxide gas or carbon dioxide gas and hydrogen sulfide gas, which are corrosive gases. The term "a high temperature" as used herein represents a temperature not lower than 150 degrees C. The oil well pipe used in a high-temperature environment of deep oil well is required to meet the three requirements as below.

(1) High strength. Specifically, the 0.2% offset yield stress is 758 MPa or higher (110 ksi class or higher). For the deep oil well, since the well has a large well depth, the length and weight of steel pipe used increase. Therefore, a high strength is required.

(2) Excellent corrosion resistance. Specifically, the corrosion rate in a high-temperature environment is lower than 0.1 g/(m$^2$·hr). Further, the oil well pipe is less liable to crack even when the pipe is stressed. That is, the oil well pipe has excellent stress corrosion cracking resistance. Hereinafter, "stress corrosion cracking" is also abbreviated as SCC. When reference is made to "excellent corrosion resistance in high-temperature environment" herein, it means that the corrosion rate is low, and the SCC resistance is excellent.

(3) Excellent sulfide stress corrosion cracking resistance at normal temperature. In the case where the stainless steel pipe for oil well is used for a production well, a fluid (oil or gas) produced from the oil well in high-temperature environment flows in the stainless steel pipe. When the production of fluid from the oil well stops for some reason, the temperature of the fluid in the stainless steel pipe near the earth's surface decreases to the normal temperature. At this time, sulfide stress corrosion cracking (hereinafter, also abbreviated as SSC) may occur in the stainless steel pipe that is in contact with the normal-temperature fluid. Therefore, the stainless steel pipe for oil well is required to have not only SCC resistance at high temperatures but also SSC resistance at normal temperature.

JP2005-336595A (hereinafter, referred to as Patent Document 1), JP2006-16637A (hereinafter, referred to as Patent Document 2), and JP2007-332442A (hereinafter, referred to as Patent Document 3) have proposed stainless steels for the use in high-temperature environments. In improving the corrosion resistance at high-temperature environments, chromium (Cr) is effective. Therefore, the stainless steels disclosed in Patent Documents 1 to 3 contain much Cr.

The stainless steel pipe disclosed in Patent Document 1 contains 15.5 to 18% of Cr, this Cr content being higher than that of the conventional martensitic stainless steel (the Cr content is 13%). Further, the chemical composition of the stainless steel pipe satisfies the formula of Cr+Mo+0.3Si−43.5C−0.4Mn−Ni−0.3Cu−9N≥11.5. Since the chemical composition satisfies this formula, the micro-structure consists of a two-phase micro-structure of ferritic phase and martensitic phase. As a result, the hot workability is improved. Further, the chemical composition of the stainless steel pipe contains Ni and Mo as essential elements and contains Cu as a selective element. Therefore, the corrosion resistance of stainless steel pipe is improved.

The stainless steel pipe disclosed in Patent Document 2 contains 15.5 to 18.5% of Cr. Further, the stainless steel disclosed in Patent Document 2 contains Ni, which improves the corrosion resistance, as an essential element. In the stainless steel pipe disclosed in Patent Document 2, Mo and Cu are selective elements.

The stainless steel pipe disclosed in Patent Document 3 contains 14 to 18% of Cr. The stainless steel pipe disclosed in Patent Document 3 further contains Ni, Mo and Cu. Therefore, the stainless steel pipe is corrosion resistant. Further, the micro-structure of the stainless steel pipe disclosed in Patent Document 3 contains a martensitic phase and an austenitic phase having a volume ratio of 3 to 15%. Therefore, the stainless steel pipe is tough.

As described above, the stainless steels disclosed in Patent Documents 1 to 3 contain more than 13% of Cr. Further, these stainless steels contain alloying elements of Ni, Mo, Cu, etc. as an essential element or a selective element. Therefore, the corrosion rate in high-temperature environments decreases. For example, in the working example of Patent Document 1, a decrease in corrosion rate in high-temperature environments has been proved (refer to Table 2 in Patent Document 1).

DISCLOSURE OF THE INVENTION

Unfortunately, in the stainless steel pipes disclosed in Patent Documents 1 to 3, cracking may occur when a stress is applied in a high-temperature environment. That is, stress corrosion cracking may occur in a high-temperature environment. Therefore, the stainless steels disclosed in Patent Documents 1 to 3 may not meet the above-described requirements (1) to (3).

Accordingly, an object of the present invention is to provide a stainless steel for oil well having the following properties:

high strength, specifically, a 0.2% offset yield stress not lower than 758 MPa;

excellent corrosion resistance in high-temperature environments; and excellent SSC resistance at normal temperature.

The inventors conducted studies and found that the stainless steel that meets the items (A) to (C) below can satisfy the above-described requirements (1) to (3).

(A) The Cr content is higher than 16.0% by mass percent. Further, Cr, Ni, Cu and Mo are contained so as to satisfy the following formula:

$$Cr+Cu+Ni+Mo \geq 25.5 \tag{1}$$

where the content (mass%) of element is substituted for the corresponding symbol of element in the formula.

If the Cr content is increased, and Formula (1) is satisfied, a strong passivation film is formed on the steel surface in high-temperature environments. Therefore, the corrosion resistance is improved. More specifically, the corrosion rate in high-temperature environments is decreased, and the SCC resistance is improved.

(B) The micro-structure contains a martensitic phase and a ferritic phase having a volume ratio of 10 to 40%. Further, the ferritic phase distribution ratio should be higher than 85%. The ferritic phase distribution ratio is explained below.

FIG. 1 is a photograph of a cross section near the surface of a stainless steel in accordance with the present invention. Referring to FIG. 1, a plurality of ferritic phases 5 extend along a surface 1 of the stainless steel. Almost all of portions other than the ferritic phases 5 in the cross section are a martensitic phase 6.

The ferritic phase distribution ratio is a measure indicating the manner of ferritic phases distributed in a portion near the surface. The ferritic phase distribution ratio is defined as described below. As shown in FIG. 2, a scale 10 having a length of 200 μm is prepared. In the scale 10, a plurality of imaginary line segments 20 each having a length of 50 μm are arranged in a row at intervals of 10 μm over the range of 200 μm in the longitudinal direction of the scale 10. The scale 10 is placed so that the upper side of the scale 10 coincides with the surface 1 of the stainless steel shown in FIG. 1. FIG. 3 shows a photograph in which the scale 10 is applied. Each of the imaginary line segments 20 has a length of 50 μm in the thickness direction of stainless steel from the surface 1. The plurality of imaginary line segments 20 are arranged in a row at intervals of 10 μm over the range of 200 μm along the surface of stainless steel. When the scale 10 is placed on the cross section of stainless steel as shown in FIG. 3, the ferritic phase distribution ratio (%) is defined by the following formula (a):

Ferritic phase distribution ratio=number of imaginary line segments crossing ferritic phases/total number of imaginary line segments×100 (a)

In short, the ratio of the number of imaginary line segments crossing ferritic phases to the total number of imaginary line segments is defined as the ferritic phase distribution ratio (%). As described above, the ferritic phase distribution ratio is higher than 85%. If the ferritic phase distribution ratio is higher than 85%, the SCC resistance in high-temperature environments is improved. FIG. 4 is a photograph of a cross section of a stainless steel having a ferritic phase distribution ratio of 71.4%. As shown in FIG. 4, a crack 7 produced in the surface 1 is propagated in the thickness direction of the stainless steel. When the front edge of the crack 7 reaches a ferritic phase 5, the propagation of the crack 7 stops. That is, the ferritic phase 5 inhibits the propagation of crack. In FIG. 4, since the ferritic phase distribution ratio is not higher than 85%, the ferritic phases 5 are not distributed widely in a portion near the surface (that is, a depth range of 50 μm from the surface). Therefore, the crack 7 is propagated to some depth.

In contrast, the ferritic phase distribution ratio of the stainless steel shown in FIG. 1 is higher than 85%. That is, the ferritic phases 5 are distributed widely in a portion near the surface. Therefore, when a crack is produced in the surface 1, the crack reaches a ferritic phase at a position shallow from the surface 1, and the propagation thereof stops. Therefore, the SCC resistance in high-temperature environments is improved.

(C) Copper (Cu) is contained in large amounts as an essential element. Specifically, the Cu content should be 1.5 to 3.0% by mass percent. In a high-temperature environment, Cu restrains the propagation of cracks. Therefore, the SCC resistance in high-temperature environments is improved. The mechanism of this is assumed as described below. If the Cu content is 1.5 to 3.0%, a passivation film is likely to form on the surface of a crack that stops propagating at a ferritic phase. Therefore, new stress corrosion cracking can be restrained from occurring from the crack surface.

Based on the above-described knowledge, the inventors completed an invention described below.

The stainless steel for oil well in accordance with the present invention has a chemical composition and micro-structure described below, and has a 0.2% offset yield stress not lower than 758 MPa. The chemical composition thereof consists of, by mass percent, C: 0.05% or less, Si: 0.5% or less, Mn: 0.01 to 0.5%, P: 0.04% or less, S: 0.01% or less, Cr: more than 16.0 and not more than 18.0%, Ni: more than 4.0 and not more than 5.6%, Mo: 1.6 to 4.0%, Cu: 1.5 to 3.0%, Al: 0.001 to 0.10%, and N: 0.050% or less, the balance being Fe and impurities, and satisfies Formulas (1) and (2). The micro-structure thereof contains a martensitic phase and a ferritic phase having a volume ratio of 10 to 40%. When a plurality of imaginary line segments, which each have a length of 50 μm in the thickness direction from the surface of stainless steel and are arranged in a row at intervals of 10 μm over the range of 200 μm, are placed on the cross section of the stainless steel, the ratio of the number of imaginary line segments crossing ferritic phases to the total number of imaginary line segments is higher than 85%.

$$Cr+Cu+Ni+Mo \geq 25.5 \quad (1)$$

$$-8 \leq 30(C+N)+0.5Mn+Ni+Cu/2+8.2-1.1(Cr+Mo) \leq -4 \quad (2)$$

where the content (mass %) of element is substituted for the symbol of element in Formulas (1) and (2).

The 0.2% offset yield stress is defined as described below. In a stress-strain curve graph in which the ordinates represent stress and the abscissas represent strain, a stress corresponding to the intersection of the stress-strain curve and an imaginary straight line in parallel with a straight-line portion (elastic zone) of the curve is referred to as an offset yield stress. The distance between the starting point of the stress-strain curve and the point at which the imaginary straight line intersects with the abscissa is referred to as an offset amount. An offset yield stress having an offset amount of 0.2% is referred to as a 0.2% offset yield stress.

Preferably, the aforementioned chemical composition contains, in place of some of Fe, one or more kinds selected from the group consisting of V: 0.25% or less, Nb: 0.25% or less, Ti: 0.25% or less, and Zr: 0.25% or less.

Preferably, the above-described chemical composition contains, in place of some of Fe, one or more kinds selected from the group consisting of Ca: 0.005% or less, Mg: 0.005% or less, La: 0.005% or less, and Ce: 0.005% or less.

Preferably, the aforementioned micro-structure contains a retained austenitic phase having a volume ratio not more than 10%.

A stainless steel pipe for oil well in accordance with the present invention is manufactured by using the above-described stainless steel.

A method of manufacturing a stainless steel for oil well in accordance with the present invention includes the following steps of S1 to S4:

(S1) A step of heating a steel stock having a chemical composition consisting of, by mass percent, C: 0.05% or less, Si: 0.5% or less, Mn: 0.01 to 0.5%, P: 0.04% or less, S: 0.01% or less, Cr: more than 16.0 and not more than 18.0%, Ni: more than 4.0 and not more than 5.6%, Mo: 1.6 to 4.0%, Cu: 1.5 to 3.0%, Al: 0.001 to 0.10%, and N: 0.050% or less, the balance being Fe and impurities, and satisfying Formulas (1) and (2).

(S2) A step of hot working the steel stock so that the reduction of area of the steel stock at a steel stock temperature of 850 to 1250° C. is not less than 50%.

(S3) A step of heating the steel stock to a temperature not lower than Ac3 transformation point and quenching it after the hot working.

(S4) A step of tempering the steel stock at a temperature not higher than Ac1 transformation point after the quenching.

The reduction of area (%) is defined by the following formula (3):

$$\text{Reduction of area} = (1 - \text{steel stock cross-sectional area perpendicular to the steel stock longitudinal direction after hot working/steel stock cross-sectional area perpendicular to the steel stock longitudinal direction before hot working}) \times 100 \quad (3)$$

Through the above-described steps, a stainless steel for oil well, having the above-described chemical composition, micro-structure, and yield stress, is manufactured.

BEST MODE FOR CARRYING OUT THE INVENTION

Figure 1:
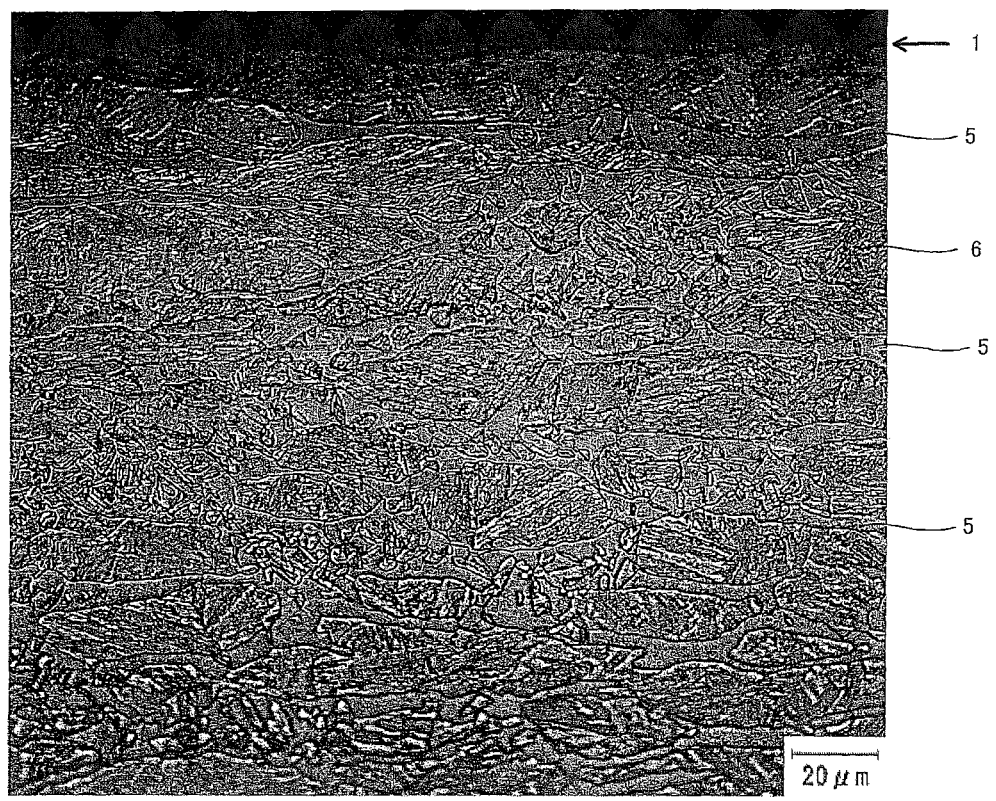
FIG. 1 is a photograph of a cross section of a stainless steel for oil well in accordance with the present invention.

An embodiment of the present invention will now be described in detail.

1. Chemical Composition

The stainless steel for oil well in accordance with the present invention has a chemical composition described below. Hereinafter, the percentage relating to the element means mass percent.

C: 0.05% or less

Carbon (C) improves the strength of steel. However, if the C content is too high, the hardness after tempering becomes excessively high, and the SSC resistance is deteriorated. Further, in the chemical composition of the present invention, as the C content increases, the Ms point decreases. Therefore, as the C content increases, the retained austenite is liable to increase, and the 0.2% offset yield stress is liable to decrease. Therefore, the C content should be 0.05% or less. The preferable C content is 0.03% or less. The lower limit of C content is not subject to any special restriction. However, considering the cost of decarburization in the steel making process, the preferable C content is 0.003% or more, further preferably 0.007% or more.

Si: 0.5% or less

Silicon (Si) deoxidizes steel. If the Si content is too high, the toughness and hot workability of steel are deteriorated. Therefore, the Si content should be 0.5% or less.

Mn: 0.01 to 0.5%

Manganese (Mn) deoxidizes and desulfurizes steel, and improves the hot workability. If the Mn content is too low, the above-described effects cannot be achieved. If the Mn content is too high, the corrosion resistance in high-temperature environments is deteriorated. Therefore, the Mn content should be 0.01 to 0.5%. The preferable Mn content is 0.05% or more and less than 0.2%.

P: 0.04% or less

Phosphorus (P) is an impurity. Phosphorus deteriorates the SSC resistance. Therefore, the P content should be 0.04% or less. The preferable P content is not more than 0.025%.

S: 0.01% or less

Sulfur (S) is an impurity. Sulfur deteriorates the hot workability. Therefore, the S content should be 0.01% or less. The preferable S content is not more than 0.005%, further preferably not more than 0.002%.

Cr: more than 16.0 and not more than 18.0%

Chromium (Cr) improves the corrosion resistance in high-temperature environments. Specifically, Cr decreases the corrosion rate in high-temperature environments and improves the SCC resistance. If the Cr content is too low, the above-described effects cannot be achieved. If the Cr content is too high, the ferritic phase in steel increases, and the strength of steel is deteriorated. Therefore, the Cr content should be more than 16.0% and not more than 18.0%. The preferable Cr content is 16.3 to 18.0%.

Ni: more than 4.0 and not more than 5.6%

Nickel (Ni) improves the strength of steel. Further, Ni improves the corrosion resistance in high-temperature environments. If the Ni content is too low, the above-described effects cannot be achieved. However, if the Ni content is too high, the amount of retained austenite produced is liable to increase. Hereby, it is difficult to obtain a 0.2% offset yield stress of 758 MPa or higher.

Therefore, the Ni content should be more than 4.0% and not more than 5.6%. The preferable Ni content is 4.2 to 5.4%.

Mo: 1.6 to 4.0%

Molybdenum (Mo) improves the SSC resistance. If the Mo content is too low, the above-described effect cannot be achieved. On the other hand, even if Mo is contained excessively, the above-described effect saturates. Therefore, the Mo content should be 1.6 to 4.0%. The preferable Mo content is 1.8 to 3.3%.

Cu: 1.5 to 3.0%

Copper (Cu) improves the strength of steel by means of precipitation hardening. Further, as described above, Cu improves the SCC resistance in high-temperature environments. Still further, Cu decreases the corrosion rate. If the Cu content is too low, the above-described effects cannot be achieved. If the Cu content is too high, the hot workability is deteriorated. Therefore, the Cu content should be 1.5 to 3.0%. The preferable Cu content is 2.0 to 3.0%, further preferably 2.3 to 2.8%.

Al: 0.001 to 0.10%

Aluminum (Al) deoxidizes steel. If the Al content is too low, the above-described effect cannot be achieved. If the Al content is too high, the inclusions in steel increase, so that the corrosion resistance is deteriorated. Therefore, the Al content should be 0.001 to 0.10%.

N: 0.050% or less

Nitrogen (N) improves the strength of steel. However, if the N content is too high, the inclusions in steel increase, so that the corrosion resistance is deteriorated. Therefore, the N content should be 0.050% or less. The preferable N content is 0.026% or less. The lower limit value of preferable N content is 0.002%.

The chemical composition of the stainless steel in accordance with the present invention further satisfies Formula (1):

$$Cr+Cu+Ni+Mo \geq 25.5 \qquad (1)$$

where the content of element is substituted for the corresponding symbol of element in Formula (1).

If the contents of Cr, Cu, Ni and Mo in the steel satisfy Formula (1), in high-temperature environments, a strong passivation film is formed on the surface of the stainless steel. Therefore, the corrosion rate in high-temperature environments decreases. Further, the SCC resistance is improved in high-temperature environments.

2. Micro-structure

The stainless steel in accordance with the present invention has a micro-structure containing a ferritic phase having a volume ratio of 10 to 40%. The remaining portion of micro-structure other than the ferritic phase is mainly a martensitic phase, additionally including a retained austenitic phase. If the amount of retained austenitic phase increases excessively, it is difficult to obtain high strength. Therefore, the preferable volume ratio of retained austenitic phase in the steel is 10% or less.

The volume ratio of the ferritic phase is determined by the method described below. A sample may be taken from any location in the stainless steel. The sample surface corresponding to the cross section of the stainless steel is ground. After being ground, the ground sample surface is etched by using a solution in which glycerin is mixed with aqua regia. Using an optical microscope (observation magnification ×100), the area ratio of ferritic phase on the etched surface is measured by the point counting method conforming to JISG0555. The measured area ratio is defined as the volume ratio of ferritic phase.

The volume ratio of the retained austenitic phase is determined by the X-ray diffraction method. A sample may be taken from any location in the stainless steel. The size of the sample is 15 mm×15 mm×2 mm. Using this sample, X-ray intensity is measured on the (200) plane of $\alpha$ (ferrite) phase, the (211) plane of $\alpha$ phase, and the (200) plane, the (220) plane, and the (311) plane of $\gamma$ (retained austenite) phase. Then, the integrated intensity on each plane is calculated. After the calculation, the volume ratio $V\gamma$ (%) is calculated for each of combinations of the planes of $\alpha$ phase and the planes of $\gamma$ phase (a total of six combinations) by using Formula (4). The mean value of the volume ratios $V\gamma$ of the six combinations is defined as the volume ratio (%) of retained austenite.

$$V\gamma = 100/(1 + (I\alpha \cdot R\gamma)/(I\gamma \cdot R\alpha)) \quad (4)$$

where $I\alpha$ is the integrated intensity of $\alpha$ phase, $R\alpha$ is the crystallographic theoretical calculation value of $\alpha$ phase, $I\gamma$ is the integrated intensity of $\gamma$ phase, and $R\gamma$ is the crystallographic theoretical calculation value of $\gamma$ phase.

If the volume ratio of ferritic phase is 10 to 40%, a 0.2% offset yield stress of 758 MPa or higher can be obtained. Further, the ferritic phase inhibits the propagation of cracking. Therefore, the SCC resistance in high-temperature environments is improved.

The micro-structure of the stainless steel whose chemical composition satisfies Formula (2) and which is manufactured by the manufacturing method described later can have a configuration containing 10 to 40% of ferritic phase.

$$-8 \leq 30(C+N) + 0.5Mn + Ni + Cu/2 + 8.2 - 1.1(Cr+Mo) \leq -4 \quad (2)$$

where the content of element is substituted for the corresponding symbol of element in Formula (2).

It is defined that X=30(C+N)+0.5Mn+Ni+Cu /2+8.2−1.1 (Cr+Mo). If X is less than −8, the volume ratio of ferritic phase exceeds 40%. If the volume ratio of ferritic phase exceeds 40%, cracking is liable to occur in high-temperature environments. The reason for this is unclear; however, the reason can be assumed as described below. The concentration distribution of Cr occurs between the ferritic phase and the martensitic phase. Specifically, the Cr content in the ferritic phase is higher than the Cr content in the martensitic phase. Chromium is thought to be effective in preventing the propagation of cracking in high-temperature environments. However, when the volume ratio of ferritic phase increases and exceeds 40%, the Cr content in the ferritic phase decreases below the content that is effective in preventing the propagation of cracking in high-temperature environments. Therefore, it is thought that cracking is liable to occur.

On the other hand, if X is more than −4, the volume ratio of ferritic phase is less than 10%. If the ferritic phase is too little, the propagation of cracking cannot be restrained. The preferable range of X is −7.7 to −4.3.

As described above, the ferritic phase distribution ratio is higher than 85%. FIG. 1 shows one example of the cross section of the stainless steel in accordance with the present invention. The thickness of a ferritic phase 5 near the surface 1 is mostly about 0.5 to 1 μm. The length of the ferritic phase 5 is mostly about 50 to 200 μm. In FIG. 1, since the ferritic phase distribution ratio is higher than 85%, the ferritic phases 5 are distributed in the whole area under the surface 1. For this reason, the cracking occurring on the surface 1 reaches the ferritic phase 5 at a position shallow from the surface 1, and the propagation thereof is inhibited. Therefore, the SCC resistance is improved.

Figure 4:
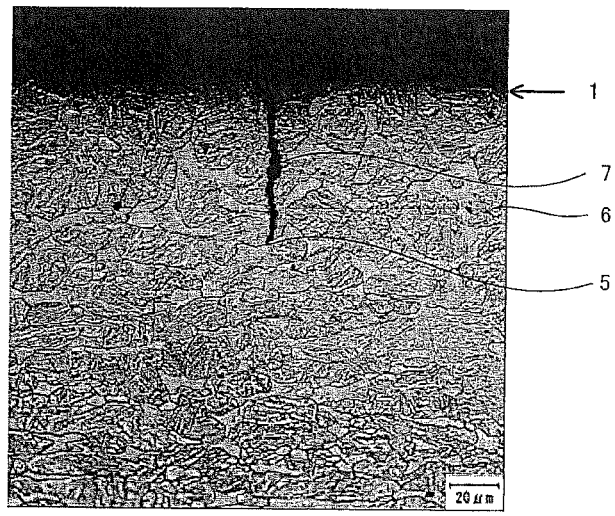
FIG. 4 is a photograph of a cross section of a stainless steel having a ferritic phase distribution ratio of 85% or lower.

If the ferritic phase distribution ratio is 85% or lower though the above-described chemical composition, Formula (1), and Formula (2) are within the range according to the present invention, the ferritic phase distribution ratio is 85% or lower. In FIG. 4 in which the ferritic phase distribution ratio is 85% or lower, the length of the ferritic phase 5 in the direction in parallel with the surface 1 is shorter than the length of the ferritic phase 5 in FIG. 1. The ferritic phases 5 in FIG. 4 are not distributed so widely as in FIG. 1. Therefore, the distance in which a crack 7 reaches the ferritic phase 5 is longer than that in FIG. 1. As a result, stress corrosion cracking is liable to occur.

3. Selective Elements

The chemical composition of the stainless steel for oil well in accordance with the present invention may further contain, in place of some of Fe, one or more kinds selected from the group consisting of a plurality of elements described below.

V: 0.25% or less
Nb: 0.25% or less
Ti: 0.25% or less
Zr: 0.25% or less

All of vanadium (V), niobium (Nb), titanium (Ti), and zirconium (Zr) are selective elements. These elements form carbides to improve the strength and toughness of steel. However, if the contents of these elements are too high, the carbides coarsen, so that the toughness is deteriorated. Also, the corrosion resistance is deteriorated. Therefore, the V content should be 0.25% or less, the Nb content should be 0.25% or less, the Ti content should be 0.25% or less, and the Zr content should be 0.25% or less. Preferably, the content of V, Nb or Zr is 0.005 to 0.25%, and the Ti content is 0.05 to 0.25%. In this case, the above-described effects can be achieved especially effectively.

The chemical composition of the stainless steel for oil well in accordance with the present invention may further contain, in place of some of Fe, one or more kinds selected from the group consisting of a plurality of elements described below.

Ca: 0.005% or less
Mg: 0.005% or less
La: 0.005% or less
Ce: 0.005% or less

All of calcium (Ca), magnesium (Mg), lanthanum (La), and cerium (Ce) are selective elements. These elements improve the hot workability of steel. However, if the contents of these elements are too high, coarse oxides are formed, so that the corrosion resistance is deteriorated. Therefore, the content of each of these elements should be 0.005% or less. Preferably, the Ca content, the Mg content, the La content, and the Ce content each are 0.0002 to 0.005%. In this case, the above-described effect can be achieved especially effectively.

Even if these selective elements are contained, the micro-structure described in item 2 can be obtained.

4. Manufacturing Method

A method of manufacturing the stainless steel for oil well in accordance with the present invention is described. If a steel stock (cast piece, billet, bloom and slab etc.) having the above-described chemical composition and satisfying Formulas (1) and (2) is hot worked with a predetermined reduction of area, the micro-structure described in item 2 can be obtained. Hereunder, the method of manufacturing the stainless steel pipe for oil well is described as one example of the stainless steel for oil well in accordance with the present invention.

S1: Steel Stock Preparing and Heating Step

A steel stock having the above-described chemical composition and satisfying Formulas (1) and (2) is prepared. The steel stock may be a cast piece manufactured by the round billet continuous casting process. Also, the steel stock may be a billet manufactured by hot working an ingot manufactured by the ingot making process, or may be a billet manufactured from a cast piece produced by the bloom continuous casting. The prepared steel stock is charged into a heating furnace or a soaking pit and is heated.

S2: Hot Working Step

Successively, the heated steel stock is hot worked to manufacture a material pipe. For example, the Mannesmann process is implemented for hot working. Specifically, the steel stock is pierced by a piercing machine to form a material pipe. Then, the material pipe is rolled by a mandrel mill or a sizing mill. For hot working, hot extrusion may be accomplished, or forging may be performed.

At this time, hot working is performed so that the reduction of area of the steel stock at a steel stock temperature of 850 to 1250° C. is 50% or more. The reduction of area (%) is defined by the aforementioned Formula (3).

If the reduction of area of the steel stock at a steel stock temperature of 850 to 1250° C. is 50% or more, a micro-structure in which a ferritic phase having a volume ratio of 10 to 40% is contained and the ferritic phase distribution ratio is higher than 85% can be obtained. On the other hand, even for the steel stock having the chemical composition of the present invention and satisfying Formulas (1) and (2), if the reduction of area is less than 50%, the ferritic phase distribution ratio is sometimes 85% or less.

The material pipe having been hot worked is cooled to normal temperature. The cooling method may be air cooling or may be water cooling.

S3 and S4: Quenching Step and Tempering Step

After the hot working, the material pipe is quenched and tempered so that the 0.2% offset yield stress is 758 MPa or higher. The preferable quenching temperature is the Ac3 transformation point or higher. The preferable tempering temperature is the Ac1 transformation point or lower. Through the above-described steps, the stainless steel pipe in accordance with the present invention is manufactured.

Method of Manufacturing Other Stainless Steel Products

The above is the description of the method of manufacturing a seamless stainless steel pipe given as one example of the method of manufacturing the stainless steel. The manufacturing method for other stainless steel products (for example, a steel plate, an electric resistance welded steel tube, and a laser welded steel tube) manufactured from the stainless steel is the same as that for the seamless stainless steel pipe. For example, a stainless steel plate is manufactured by rolling a steel stock by using a rolling mill in the hot working step.

EXAMPLES

A steel having the chemical composition given in Table 1 was melted to manufacture a cast piece or a billet.

TABLE 1

| | | Chemical compound: unit being mass %, balance being Fe and unavoidable impurities | | | | | | | | | | | Value of | |
|---|---|---|---|---|---|---|---|---|---|---|---|---|---|---|
| Classification | Steel | C | Si | Mn | P | S | Cr | Cu | Ni | Mo | Al | N | Others V, Nb, Ti, Zr, Ca, Mg, La, Ce | Formula (1) Cr + Cu + Ni + Mo | Value of Formula (2) X |
| Invention steel | A | 0.020 | 0.24 | 0.10 | 0.017 | 0.0009 | 16.96 | 2.48 | 5.03 | 2.55 | 0.045 | 0.0153 | — | 27.02 | −5.88 |
| | B | 0.010 | 0.25 | 0.08 | 0.017 | 0.0004 | 16.99 | 2.42 | 4.53 | 2.56 | 0.049 | 0.0065 | — | 26.50 | −7.03 |
| | C | 0.025 | 0.24 | 0.17 | 0.018 | 0.0005 | 17.09 | 2.36 | 4.51 | 2.52 | 0.049 | 0.0066 | — | 26.48 | −6.65 |
| | D | 0.027 | 0.25 | 0.13 | 0.017 | 0.0005 | 17.49 | 2.45 | 4.15 | 2.53 | 0.045 | 0.0110 | — | 26.62 | −7.24 |
| | E | 0.024 | 0.25 | 0.05 | 0.016 | 0.0010 | 16.43 | 2.45 | 4.55 | 2.49 | 0.031 | 0.0200 | — | 25.92 | −5.49 |
| | F | 0.023 | 0.24 | 0.18 | 0.019 | 0.0005 | 16.14 | 2.39 | 5.47 | 2.50 | 0.049 | 0.0052 | — | 26.50 | −4.70 |
| | G | 0.020 | 0.23 | 0.03 | 0.018 | 0.0005 | 17.04 | 2.49 | 4.53 | 2.54 | 0.041 | 0.0069 | — | 26.60 | −6.74 |
| | H | 0.021 | 0.25 | 0.16 | 0.018 | 0.0004 | 17.05 | 2.39 | 4.41 | 2.52 | 0.051 | 0.0055 | — | 26.37 | −6.85 |
| | I | 0.033 | 0.24 | 0.15 | 0.018 | 0.0004 | 17.38 | 2.54 | 4.94 | 2.55 | 0.050 | 0.0131 | — | 27.41 | −6.06 |
| | J | 0.022 | 0.24 | 0.13 | 0.018 | 0.0004 | 16.86 | 2.46 | 5.05 | 1.80 | 0.050 | 0.0080 | — | 26.17 | −5.08 |
| | K | 0.019 | 0.24 | 0.15 | 0.018 | 0.0004 | 16.92 | 2.48 | 5.03 | 3.18 | 0.050 | 0.0076 | — | 27.61 | −6.77 |
| | L | 0.022 | 0.24 | 0.15 | 0.017 | 0.0004 | 16.86 | 2.91 | 5.03 | 2.55 | 0.050 | 0.0066 | — | 27.35 | −5.73 |
| | M | 0.022 | 0.24 | 0.30 | 0.018 | 0.0004 | 16.86 | 2.48 | 5.03 | 2.55 | 0.050 | 0.0066 | — | 26.92 | −5.87 |
| | N | 0.023 | 0.24 | 0.31 | 0.017 | 0.0004 | 16.95 | 2.39 | 4.57 | 2.55 | 0.055 | 0.0080 | — | 26.46 | −6.40 |
| | O | 0.023 | 0.24 | 0.45 | 0.017 | 0.0004 | 17.11 | 2.39 | 4.58 | 2.55 | 0.055 | 0.0084 | — | 26.63 | −6.48 |
| | P | 0.023 | 0.25 | 0.31 | 0.018 | 0.0006 | 17.03 | 2.38 | 4.10 | 2.52 | 0.054 | 0.0092 | — | 26.03 | −6.89 |
| | Q | 0.024 | 0.25 | 0.16 | 0.017 | 0.0015 | 16.13 | 2.42 | 4.56 | 2.51 | 0.044 | 0.0200 | — | 25.62 | −5.13 |
| | R | 0.023 | 0.25 | 0.18 | 0.017 | 0.0006 | 17.03 | 2.38 | 4.61 | 3.80 | 0.054 | 0.0155 | — | 27.82 | −7.67 |
| | S | 0.044 | 0.25 | 0.18 | 0.017 | 0.0007 | 17.02 | 2.42 | 4.53 | 2.56 | 0.044 | 0.0065 | — | 26.53 | −5.99 |
| | T | 0.042 | 0.25 | 0.31 | 0.017 | 0.0004 | 16.99 | 2.42 | 4.53 | 2.56 | 0.049 | 0.0065 | — | 26.50 | −5.96 |
| | U | 0.022 | 0.24 | 0.10 | 0.017 | 0.0009 | 17.01 | 2.48 | 5.03 | 2.55 | 0.045 | 0.0153 | V: 0.05 | 27.07 | −5.88 |
| | V | 0.022 | 0.24 | 0.10 | 0.017 | 0.0009 | 16.94 | 2.48 | 5.03 | 2.55 | 0.045 | 0.0153 | Nb: 0.06 | 27.00 | −5.80 |
| | W | 0.022 | 0.24 | 0.10 | 0.017 | 0.0009 | 17.51 | 2.48 | 5.03 | 2.55 | 0.045 | 0.0153 | Ti: 0.11 | 27.57 | −6.43 |
| | X | 0.022 | 0.24 | 0.10 | 0.017 | 0.0009 | 16.94 | 2.48 | 5.03 | 2.55 | 0.045 | 0.0153 | Zr: 0.05 | 27.00 | −5.80 |
| | AA | 0.022 | 0.24 | 0.10 | 0.017 | 0.0009 | 16.94 | 2.48 | 5.03 | 2.55 | 0.045 | 0.0153 | Ca: 0.0010 | 27.00 | −5.80 |
| | AB | 0.022 | 0.24 | 0.10 | 0.017 | 0.0009 | 16.94 | 2.48 | 5.03 | 2.55 | 0.045 | 0.0153 | Mg: 0.0013 | 27.00 | −5.80 |

TABLE 1-continued

| | | Chemical compound: unit being mass %, balance being Fe and unavoidable impurities | | | | | | | | | | | Value of | |
|---|---|---|---|---|---|---|---|---|---|---|---|---|---|---|
| Classification | Steel | C | Si | Mn | P | S | Cr | Cu | Ni | Mo | Al | N | Others V, Nb, Ti, Zr, Ca, Mg, La, Ce | Formula (1) Cr + Cu + Ni + Mo | Value of Formula (2) X |
| | AC | 0.022 | 0.24 | 0.10 | 0.017 | 0.0009 | 16.94 | 2.48 | 5.03 | 2.55 | 0.045 | 0.0153 | V: 0.04, Ti: 0.09, Ca: 0.0010 | 27.00 | −5.80 |
| | AD | 0.022 | 0.24 | 0.10 | 0.017 | 0.0009 | 16.94 | 2.48 | 5.03 | 2.55 | 0.045 | 0.0153 | V: 0.06, Ti: 0.08, Mg: 0.0021 | 27.00 | −5.80 |
| | AE | 0.020 | 0.24 | 0.10 | 0.018 | 0.0009 | 17.01 | 2.48 | 5.06 | 2.53 | 0.040 | 0.0161 | V: 0.05 | 27.08 | −5.86 |
| | AF | 0.008 | 0.23 | 0.18 | 0.018 | 0.0005 | 17.04 | 2.49 | 4.53 | 2.54 | 0.041 | 0.0070 | V: 0.05 | 26.60 | −7.02 |
| Comparative steel | BA | 0.034 | 0.25 | 0.16 | 0.017 | 0.0008 | 16.45 | 1.90 | 5.53 | 1.75 | 0.044 | 0.0190 | — | 25.63 | −3.67 |
| | BB | 0.012 | 0.24 | 0.12 | 0.017 | 0.0004 | 17.81 | 2.50 | 4.08 | 2.67 | 0.044 | 0.0140 | — | 27.06 | −8.16 |
| | BC | 0.021 | 0.26 | 0.31 | 0.016 | 0.0010 | 16.46 | 1.51 | 4.58 | 2.50 | 0.035 | 0.0210 | — | 25.05 | −5.91 |
| | BD | 0.021 | 0.24 | 0.31 | 0.016 | 0.0007 | 16.57 | 2.64 | 4.97 | 1.51 | 0.035 | 0.0190 | — | 25.69 | −4.04 |
| | BE | 0.060 | 0.25 | 0.01 | 0.016 | 0.0007 | 16.99 | 2.42 | 4.53 | 2.56 | 0.040 | 0.0065 | — | 26.50 | −5.57 |
| | BF | 0.030 | 0.25 | 0.32 | 0.017 | 0.0010 | 14.89 | 1.02 | 6.21 | 2.01 | 0.001 | 0.0410 | — | 24.13 | −1.38 |
| | BG | 0.021 | 0.24 | 0.30 | 0.017 | 0.0004 | 17.56 | 2.50 | 3.42 | 2.55 | 0.041 | 0.0130 | — | 26.03 | −8.08 |
| | BH | 0.020 | 0.23 | 0.32 | 0.015 | 0.0010 | 16.41 | 1.53 | 3.59 | 2.51 | 0.018 | 0.0210 | — | 24.04 | −6.87 |
| | BI | 0.021 | 0.23 | 0.18 | 0.015 | 0.0010 | 16.15 | 1.01 | 6.02 | 2.51 | 0.002 | 0.0190 | V: 0.05 | 25.69 | −4.51 |

\* Underlined value indicates that the value is out of range of corresponding value of present invention.
\* X = 30(C + N) + 0.5Mn + Ni + Cu/2 + 8.2 − 1.1(Cr + Mo)

Referring to Table 1, the chemical compositions of steels A to X and AA to AF were within the range of chemical composition of the present invention. Also, the chemical compositions of steels A to X and AA to AF satisfied Formulas (1) and (2).

On the other hand, steels BA to BI departed from the range according to the present invention. Specifically, the chemical compositions of steels BA and BB were within the range according to the present invention, and also satisfied Formula (1), but did not satisfy Formula (2). The chemical composition of steel BC was within the range according to the present invention, and also satisfied Formula (2), but did not satisfy Formula (1). The Mo content of steel BD was lower than the lower limit of Mo content of the present invention. The C content of steel BE exceeded the upper limit of C content of the present invention. The Cr content and the Cu content of steel BF were lower than the lower limits of Cr content and Cu content of the present invention, and further did not satisfy Formulas (1) and (2). The Ni content of steel BG was lower than the lower limit of Ni content of the present invention. The Ni content of steel BH was lower than the lower limit of Ni content of the present invention, and further did not satisfy Formula (1). The Cu content of steel BI was lower than the lower limit of Cu content of the present invention. The Ac1 transformation points of steels A to X, AA to AF, and BA to BI were within the range of 630 to 710° C., and the Ac3 transformation points thereof were within the range of 720 to 780° C.

Steels A to X, steels AA to AD, steel AF, and steels BA to BI were cast pieces each having a thickness of 30 mm. Also, steel AE was a solid round billet having a diameter of 191 mm. Steel S and steel AE each were prepared in plural numbers.

Using the prepared cast pieces and slabs, stainless steel plates and stainless steel pipes of test numbers 1 to 44 given in Table 2 were manufactured.

TABLE 2

| | | | | Metal micro-structure | | | | High-temperature corrosion resistance | | |
|---|---|---|---|---|---|---|---|---|---|---|
| | | | | Ferritic | Austenitic | Martensitic | Ferritic phase | | | |
| Test number | Steel | YS (MPa) | Reduction of area (%) | phase volume ratio (%) | phase volume ratio (%) | phase volume ratio (%) | distribution ratio (%) | Crack | Corrosion rate | SSC resistance |
| 1 | A | 882 | 52.0 | 23 | 2 | 75 | 100 | Absent | <0.1 | Absent |
| 2 | B | 893 | 52.0 | 38 | 4 | 58 | 100 | Absent | <0.1 | Absent |
| 3 | C | 911 | 52.0 | 35 | 5 | 60 | 100 | Absent | <0.1 | Absent |
| 4 | D | 911 | 57.9 | 39 | 1 | 60 | 100 | Absent | <0.1 | Absent |
| 5 | E | 835 | 57.9 | 18 | 0 | 82 | 100 | Absent | <0.1 | Absent |
| 6 | F | 762 | 57.9 | 13 | 7 | 80 | 100 | Absent | <0.1 | Absent |
| 7 | G | 901 | 57.9 | 30 | 5 | 65 | 100 | Absent | <0.1 | Absent |
| 8 | H | 911 | 57.9 | 32 | 2 | 66 | 100 | Absent | <0.1 | Absent |
| 9 | I | 951 | 57.9 | 25 | 2 | 73 | 100 | Absent | <0.1 | Absent |
| 10 | J | 870 | 57.9 | 35 | 3 | 62 | 100 | Absent | <0.1 | Absent |
| 11 | K | 882 | 57.9 | 20 | 4 | 76 | 100 | Absent | <0.1 | Absent |
| 12 | L | 944 | 57.9 | 25 | 4 | 71 | 100 | Absent | <0.1 | Absent |
| 13 | M | 907 | 57.9 | 25 | 4 | 71 | 100 | Absent | <0.1 | Absent |
| 14 | N | 918 | 57.9 | 30 | 2 | 68 | 100 | Absent | <0.1 | Absent |
| 15 | O | 931 | 57.9 | 30 | 2 | 68 | 100 | Absent | <0.1 | Absent |
| 16 | P | 830 | 57.9 | 35 | 1 | 64 | 100 | Absent | <0.1 | Absent |
| 17 | Q | 814 | 57.9 | 18 | 3 | 79 | 100 | Absent | <0.1 | Absent |
| 18 | R | 855 | 76.7 | 38 | 1 | 61 | 100 | Absent | <0.1 | Absent |
| 19 | S | 848 | 76.7 | 25 | 1 | 74 | 100 | Absent | <0.1 | Absent |

TABLE 2-continued

| | | | Metal micro-structure | | | | High-temperature corrosion resistance | | |
| | | | Ferritic | Austenitic | Martensitic | Ferritic phase | | | |
| Test number | Steel | YS (MPa) | Reduction of area (%) | phase volume ratio (%) | phase volume ratio (%) | phase volume ratio (%) | distribution ratio (%) | Crack | Corrosion rate | SSC resistance |
|---|---|---|---|---|---|---|---|---|---|---|
| 20 | T | 805 | 76.7 | 20 | 6 | 74 | 100 | Absent | <0.1 | Absent |
| 21 | U | 951 | 76.7 | 22 | 1 | 77 | 100 | Absent | <0.1 | Absent |
| 22 | V | 944 | 76.7 | 20 | 2 | 78 | 100 | Absent | <0.1 | Absent |
| 23 | W | 910 | 76.7 | 28 | 0 | 72 | 100 | Absent | <0.1 | Absent |
| 24 | X | 924 | 80.0 | 20 | 2 | 78 | 100 | Absent | <0.1 | Absent |
| 25 | AA | 889 | 80.0 | 22 | 1 | 77 | 100 | Absent | <0.1 | Absent |
| 26 | AB | 869 | 80.0 | 22 | 2 | 76 | 100 | Absent | <0.1 | Absent |
| 27 | AC | 962 | 80.0 | 22 | 1 | 77 | 100 | Absent | <0.1 | Absent |
| 28 | AD | 951 | 80.0 | 22 | 1 | 77 | 100 | Absent | <0.1 | Absent |
| 29 | AF | 893 | 52 | 33 | 5 | 62 | 95.2 | Absent | <0.1 | Absent |
| 30 | AE | 910 | 57.9 | 25 | 5 | 70 | 100 | Absent | <0.1 | Absent |
| 31 | AE | 905 | 52.8 | 27 | 3 | 70 | 100 | Absent | <0.1 | Absent |
| 32 | AE | 876 | 44.2 | 22 | 5 | 73 | 71.4 | Present | <0.1 | Absent |
| 33 | S | 820 | 40 | 15 | 3 | 82 | 71.4 | Present | <0.1 | Absent |
| 34 | S | 811 | 30 | 13 | 1 | 86 | 61.9 | Present | <0.1 | Absent |
| 35 | S | 808 | 20 | 16 | 0 | 84 | 57.1 | Present | <0.1 | Absent |
| 36 | BA | 848 | 57.9 | 1 | 3 | 96 | 47.6 | Present | <0.1 | Present |
| 37 | BB | 869 | 57.9 | 70 | 0 | 30 | 100 | Present | <0.1 | Absent |
| 38 | BC | 816 | 57.9 | 20 | 0 | 80 | 100 | Present | <0.1 | Absent |
| 39 | BD | 923 | 57.9 | 11 | 7 | 82 | 85.7 | Present | <0.1 | Present |
| 40 | BE | 841 | 57.9 | 18 | 5 | 77 | 100 | Present | <0.1 | Present |
| 41 | BF | 905 | 57.9 | 0 | 0 | 100 | 0 | Present | ≥0.1 | Present |
| 42 | BG | 910 | 57.9 | 62 | 3 | 35 | 100 | Present | <0.1 | Present |
| 43 | BH | 805 | 57.9 | 33 | 0 | 67 | 100 | Present | <0.1 | Present |
| 44 | BI | 851 | 57.9 | 24 | 0 | 76 | 100 | Present | <0.1 | Absent |

Manufacture of Stainless Steel Plate

Nos. 1 to 29 and Nos. 33 to 44 stainless steel plates were manufactured as described below. The cast pieces of steels A to X, steels AA to AD, steel AF, and steels BA to BI were heated by a heating furnace. The heated cast pieces were hot forged and hot rolled to manufacture stainless steel plates each having a thickness of 6 to 14.4 mm and a width of 120 mm. The temperature of cast piece during hot working (hot forging and hot rolling) was 1000 to 1250° C. The reductions of area during hot working were as given in Table 2. The reduction of area was determined based on Formula (3). The reductions of area of Nos. 33 to 35 steel plates were less than 50%. The reductions of area of steel plates of other numbers were 50% or more.

The manufactured stainless steel plates were quenched. Specifically, the stainless steel plates were heated at a quenching temperature of 980 to 1250° C. for 15 minutes, and then was water cooled. The quenching temperatures of all test numbers were not lower than the Ac3 transformation point. The quenched steel plate was tempered at a temperature of 500 to 650° C. so that the 0.2% offset yield stress was 758 to 966 MPa. The tempering temperatures of steels of all test numbers were not higher than Ac1 transformation point.

Manufacture of Stainless Steel Pipe

Nos. 30 to 32 stainless steel pipes were manufactured as described below. After the round billet of steel AE has been heated by a heating furnace, hot working (including piercing using a piercing machine and rolling using a mandrel mill) was performed to manufacture a stainless steel pipe (seamless steel pipe). At this time, the billet temperature at the time of hot working was 950 to 1200° C. Also, the reduction of area at the time of hot working was as given in Table 2. The reduction of area of No. 32 stainless steel pipe was less than 50%. The reductions of area of stainless steel pipes of other test numbers exceeded 50%. The manufactured stainless steel pipe was quenched and tempered under the same conditions as those of the above-described stainless steel plate so that the 0.2% offset yield stress was 758 to 966 MPa.

Investigation of Micro-structure and Ferritic Phase Distribution Ratio

A sample including the surface of the stainless steel plate or the stainless steel pipe was taken from an arbitrary location in the stainless steel plate or the stainless steel pipe of each test number. The sample surface corresponding to the cross section of the stainless steel plate or the stainless steel pipe was ground. After grinding, the sample surface was etched by using a solution in which glycerin is mixed with aqua regia.

The area ratio of ferritic phase on the etched sample surface was measured by the point counting method conforming to JISG0555. The measured area ratio was defined as the volume ratio of ferritic phase. The volume ratio of the retained austenitic phase was determined by the aforementioned X-ray diffraction method. It was assumed that the martensitic phase was the remaining portion of micro-structure other than the ferritic phase and the retained austenitic phase. Therefore, the volume ratio (%) of martensitic phase was determined based on Formula (b).

Volume ratio of martensitic phase=100−(volume ratio of ferritic phase+volume ratio of retained austenitic phase)  (b)

The determined volume ratios of ferritic phase, retained austenitic phase, and martensitic phase are given in Table 2.

Figure 2:
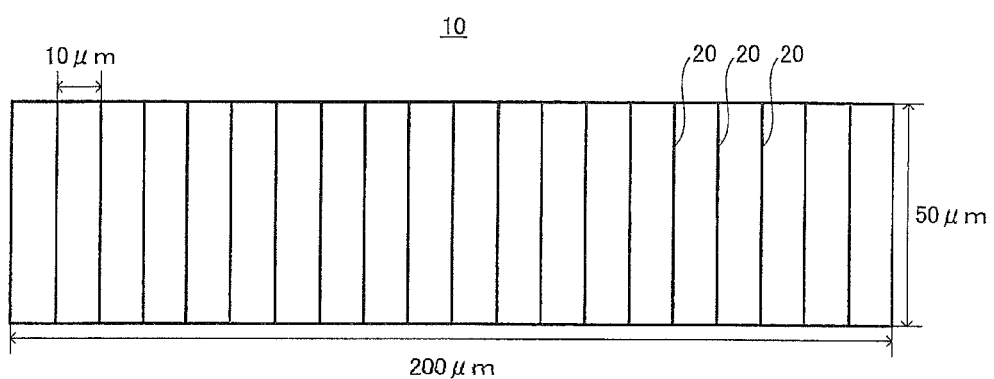
FIG. 2 is a view showing a scale for measuring a ferritic phase distribution ratio.
Figure 3:
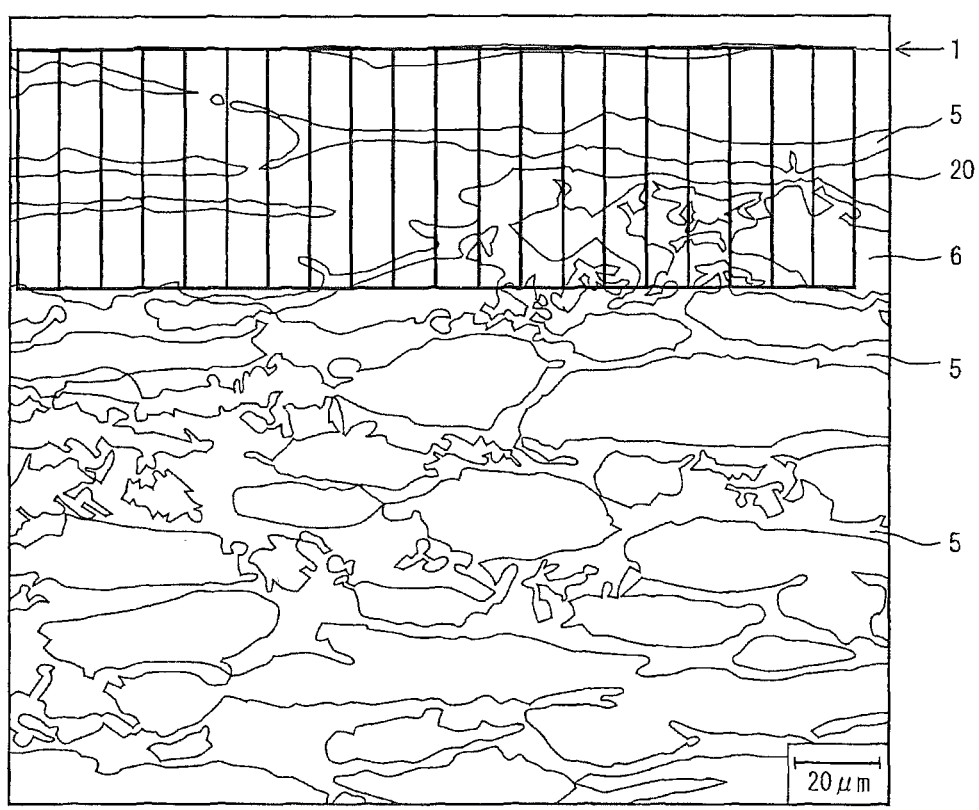
FIG. 3 is a view for explaining a method of measuring a ferritic phase distribution ratio by using the scale shown in FIG. 2.

Further, the ferritic phase distribution ratio was determined. Specifically, a scale shown in FIG. 2 was placed on the cross section of sample of each test number to determine the ferritic phase distribution ratio (%) defined by Formula (a). The determined ferritic phase distribution ratio is given in Table 2.

Tensile Test

A round bar tensile test specimen was taken from the stainless steel plate and stainless steel pipe of each test number. Using this round bar tensile test specimen, a tensile test was conducted. The longitudinal direction of the round bar tensile test specimen was the rolling direction of the stainless steel plate and the stainless steel pipe. The diameter of the parallel portion of the round bar tensile test specimen was 4 mm, and the length thereof was 20 mm. The tensile test was conducted at normal temperature (25° C.)

High-Temperature Corrosion Resistance Test

A four-point bending test specimen was taken from the stainless steel plate and stainless steel pipe of each test number. The length of the specimen was 75 mm, the width thereof was 10 mm, and the thickness thereof was 2 mm. Each specimen was deflected by four-point bending. At this time, the deflection amount of each specimen was determined in conformity to ASTM G39 so that the stress applied to each specimen is equal to the 0.2% offset yield stress of each specimen.

An autoclave of 200° C. in which $CO_2$ of 3 MPa and $H_2S$ of 0.001 MPa were sealed under pressure was prepared. The specimen subjected to deflection was immersed in NaCl aqueous solution of 25 wt % in the autoclave for one month. After one-month immersion, it was examined whether or not cracking occurred in the specimen. Specifically, the cross section of the specimen portion to which tensile stress was applied was observed using an optical microscope of ×100 magnification to judge the presence of crack. Also, the weight of specimen was measured before and after the test. From the change of measured weight, the corrosion loss of specimen was determined. Then, the corrosion rate ($g/(m^2 \cdot hr)$) was determined based on the corrosion loss.

The test results are given in Table 2. The term "Present" in "Crack" item in "High-temperature corrosion resistance" column in Table 2 indicates that a crack was confirmed by the observation using an optical microscope. The term "Absent" indicates that a crack could not be confirmed. The expression "<0.1" in "Corrosion rate" item indicates that the corrosion rate was lower than 0.1 $g/(m^2 \cdot hr)$. The expression "≥0.1" indicates that the corrosion rate was not lower than 0.1 $g/(m^2 \cdot hr)$.

SSC Resistance Test At Normal Temperature

A four-point bending test specimen was taken from the steel plate of each test number. The length of the specimen was 75 mm, the width thereof was 10 mm, and the thickness thereof was 2 mm. Each specimen was deflected by four-point bending. At this time, the deflection amount of each specimen was determined in conformity to ASTM G39 so that the stress applied to each specimen is equal to the 0.2% offset yield stress of each specimen.

An autoclave of normal temperature (25° C.) in which $CO_2$ of 0.099 MPa and $H_2S$ of 0.001 MPa were sealed was prepared. The specimen subjected to deflection was immersed in NaCl aqueous solution of 20 wt % in the autoclave for one month. After one-month immersion, it was examined whether or not cracking occurred in the specimen. The criterion of crack was the same as that in the high-temperature corrosion resistance test. The test results are given in Table 2. The term "Present" in "SSC resistance" column in Table 2 indicates that a crack was confirmed by the observation using an optical microscope. The term "Absent" indicates that a crack could not be confirmed.

Test Results

Referring to Table 2, the stainless steel plates and stainless steel pipes of test numbers 1 to 31 each had a chemical composition and micro-structure within the range according to the present invention. Therefore, in the high-temperature corrosion resistance test, no cracking (SCC) occurred, and the corrosion rate was lower than 0.1 $g/(m^2 \cdot hr)$. In the SSC resistance test at normal temperature as well, no cracking (SSC) occurred.

The chemical compositions of the stainless steel plates and stainless steel pipes of test numbers 32 to 35 were within the range according to the present invention, and satisfied Formulas (1) and (2). However, the ferritic phase distribution ratios thereof were lower than the lower limit of the present invention. Therefore, cracking occurred in the high-temperature corrosion resistance test. It is assumed that since the reductions of area of the stainless steel plates and stainless steel pipes of test numbers 32 to 35 were less than 50%, the ferritic phase distribution ratios thereof were lower than the lower limit of the present invention.

For the steel plate of test number 36, the value of X exceeded the upper limit of Formula (2), so that the volume ratio of ferritic phase was less than 10%. Therefore, cracking occurred in the high-temperature corrosion resistance test and the SSC resistance test. For the steel plate of test number 37, the value of X was lower than the lower limit of Formula (2), so that the volume ratio of ferritic phase exceeded 40%. Therefore, cracking occurred in the high-temperature corrosion resistance test. The steel plate of test number 38 did not satisfy Formula (1). Therefore, cracking occurred in the high-temperature corrosion resistance test. The reason for this is probably that a passivation film, which prevents crack propagation, was less liable to be formed on the surface of crack after the occurrence of crack.

For the steel plate of test number 39, the Mo content was lower than the lower limit of Mo content of the present invention. Therefore, cracking occurred in the high-temperature corrosion resistance test and the SSC resistance test. For the steel plate of test number 40, the C content exceeded the upper limit of C content of the present invention. Therefore, cracking occurred in the high-temperature corrosion resistance test and the SSC resistance test. For the steel plate of test number 41, the Cr content and the Cu content were lower than the lower limits of Cr content and Cu content of the present invention, and Formulas (1) and (2) were not satisfied. Therefore, cracking occurred in the high-temperature corrosion resistance test and the SSC resistance test, and the corrosion rate in the high-temperature corrosion resistance test was 0.1 $g/(m^2 \cdot hr)$ or higher. For the steel plate of test number 42, the Ni content is lower than the lower limit of Ni content of the present invention, and the value of X was lower than the lower limit value of Formula (2). Therefore, cracking occurred in the high-temperature corrosion resistance test and the SSC resistance test. For the steel plate of test number 43, the Ni content is lower than the lower limit of Ni content of the present invention, and Formula (1) was not satisfied. Therefore, cracking occurred in the high-temperature corrosion resistance test and the SSC resistance test. For the steel plate of test number 44, the Cu content is lower than the lower limit of Cu content of the present invention. Therefore, cracking occurred in the high-temperature corrosion resistance test. The reason for this is probably that a passivation film was less liable to be formed on the surface of crack after the occurrence of crack.

The above is the description of the embodiment of the present invention, and the above-described embodiment is merely an example for carrying out the present invention. Therefore, the present invention is not limited to the above-described embodiment, and the above-described embodiment can be changed as appropriate without departing from the spirit and scope of the present invention.

INDUSTRIAL APPLICABILITY

The stainless steel for oil well in accordance with the present invention can be used for oil wells and gas wells. In particular, it can be used for deep oil wells having a high-temperature environment. For example, it can be used for deep oil wells having a high-temperature environment of 150° C. to 250° C.

The invention claimed is:

1. A method of manufacturing a stainless steel for oil well, comprising:

a step of heating a steel stock having a chemical composition comprising, by mass percent, C: not more than 0.05%, Si: not more than 0.5%, Mn: 0.01 to 0.5%, P: not more than 0.04%, S: not more than 0.01%, Cr: more than 16.0 and not more than 18.0%, Ni: more than 4.0 and not more than 5.6%, Mo: 1.6 to 4.0%, Cu: 1.5 to 3.0%, Al: 0.001 to 0.10%, and N: not more than 0.050%, the balance being Fe and impurities, and satisfying Formulas (1) and (2):

$$Cr+Cu+Ni+Mo \geq 25.5 \quad (1)$$

$$-8 \leq 30(C+N)+0.5Mn+Ni+Cu/2+8.2-1.1(Cr+Mo) \leq -4 \quad (2)$$

where the content (percent by mass) of element is substituted for the symbol of element in Formulas (1) and (2);

a step of hot working the steel stock so that the reduction of area of the steel stock at a steel stock temperature of 850 to 1250° C. is not less than 50%;

a step of heating the steel stock to a temperature not lower than Ac3 transformation point and quenching it after the hot working; and a step of tempering the steel stock at a temperature not higher than Ac1 transformation point after the quenching, and the method being used for manufacturing a stainless steel having a micro-structure containing a martensitic phase and a ferritic phase having a volume ratio of 10 to 40%, and being such that when a plurality of imaginary line segments, which each have a length of 50 μm in the thickness direction from the surface of the stainless steel and are arranged in a row at intervals of 10 μm over the range of 200 μm, are placed on a cross section of the stainless steel, the ratio of the number of imaginary line segments crossing the ferritic phase to the total number of imaginary line segments is higher than 85%; and a 0.2% offset yield stress not lower than 758 MPa.

2. The method of manufacturing a stainless steel for oil well according to claim 1, wherein the chemical composition further contains, in place of some of Fe, at least one kind selected from the group consisting of V: not more than 0.25%, Nb: not more than 0.25%, Ti: not more than 0.25%, and Zr: not more than 0.25%.

3. The method of manufacturing a stainless steel for oil well according to claim 1, wherein the chemical composition further contains, in place of some of Fe, at least one kind selected from the group consisting of Ca: not more than 0.005%, Mg: not more than 0.005%, La: not more than 0.005%, and Ce: not more than 0.005%.

4. The method of manufacturing a stainless steel for oil well according to claim 2, wherein the chemical composition further contains, in place of some of Fe, at least one kind selected from the group consisting of Ca: not more than 0.005%, Mg: not more than 0.005%, La: not more than 0.005%, and Ce: not more than 0.005%.

* * * * *